Dec. 16, 1924.  
F. R. MOORE  
1,519,692  
PROPULSION MEANS FOR CHILDREN'S VEHICLES  
Filed Feb. 26, 1923   2 Sheets-Sheet 1
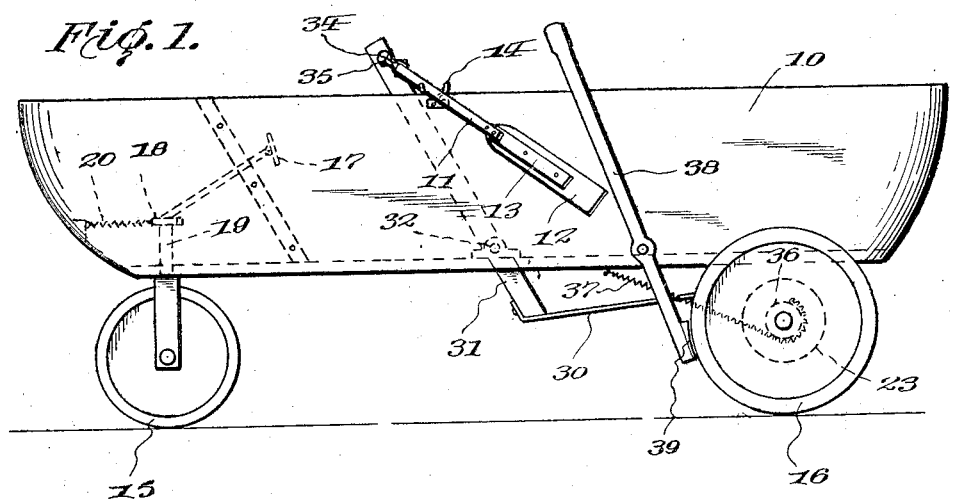
Inventor  
Fred R. Moore.  
By Milo B. Stevens  
Attorneys Dec. 16, 1924.  
F. R. MOORE  
1,519,692  
PROPULSION MEANS FOR CHILDREN'S VEHICLES  
Filed Feb. 26, 1923   2 Sheets-Sheet 2
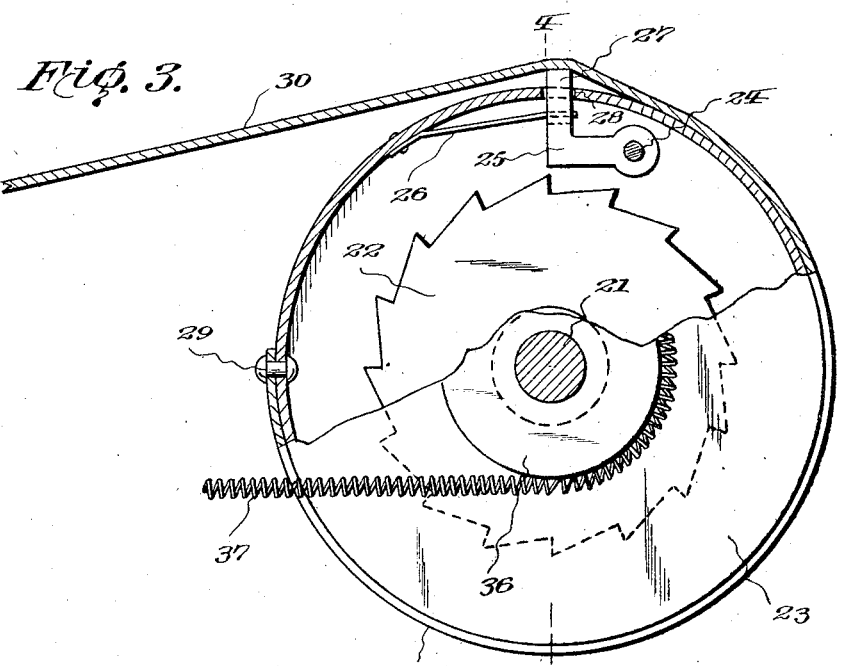
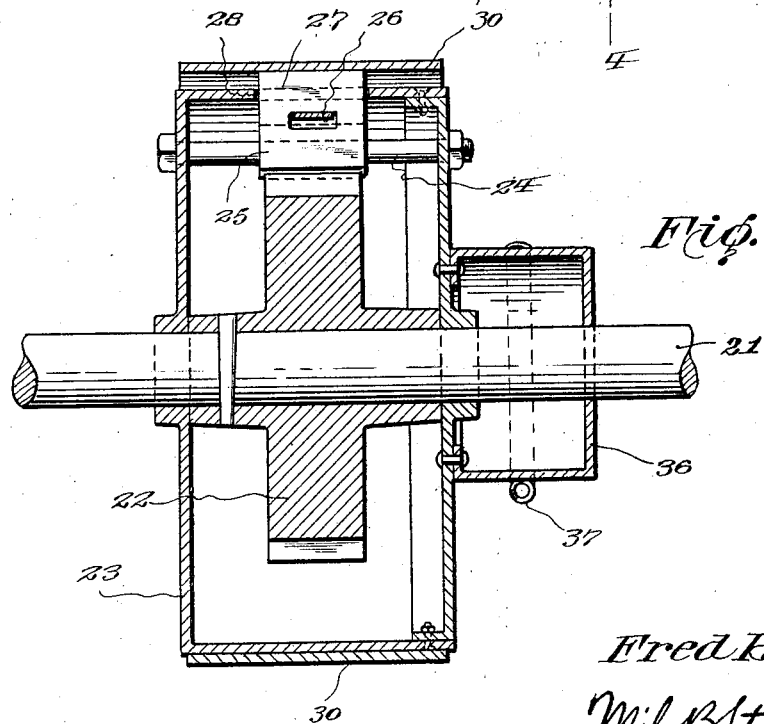
Inventor:  
Fred R. Moore.  
By Milo B. Stevens Co.  
Attorneys Patented Dec. 16, 1924.

1,519,692

UNITED STATES PATENT OFFICE.

FRED R. MOORE, OF CHICAGO, ILLINOIS.

PROPULSION MEANS FOR CHILDREN'S VEHICLES.

Application filed February 26, 1923. Serial No. 621,372.

*To all whom it may concern:*

Be it known that I, FRED R. MOORE, a citizen of the United States, residing at Chicago, in the county of Cook and State of Illinois, have invented new and useful Improvements in Propulsion Means for Children's Vehicles, of which the following is a specification.

This invention relates to small wagons designed for children's use, and its object is to provide a novel and improved pawl-and-ratchet propelling mechanism therefor.

The invention also has for its object to provide the vehicle with a body resembling a row-boat, the same being equipped with a pair of oars which have an operative connection with the propulsion means, so that they swing back and forth when the occupant of the vehicle is propelling the same.

Other objects and advantages of the invention will be pointed out in the detailed description appearing hereinafter, and in order that the invention may be fully understood, reference is had to the accompanying drawings, wherein—

Figure 1 is a side elevation of the vehicle; Fig. 2 is a plan view thereof; Fig. 3 is an enlarged elevation, partly in section, of a pawl-and-ratchet mechanism, and Fig. 4 is a section on the line 4—4 of Fig. 3.

Referring specifically to the drawings, the body 10 of the vehicle is shaped to resemble a row-boat, and it is equipped with a pair of oars, each of which consists of the loom 11 and the blade 12, the latter being a piece of canvas which is painted to stiffen it. The inner end of the blade, with a flat spring 13, is secured in a recess in the outer end of the loom. This spring extends along one side of the blade and is riveted or otherwise secured thereto. The purpose of this construction is to permit the blade of the oar to yield if it should encounter an obstruction, which latter therefore will not materially impede the travel of the vehicle, and upon clearing the obstruction the blade goes back to its normal position. The sides of the body 10 are fitted with row-locks 14 for the oars.

The body 10 is provided with a front wheel and hind wheels 15 and 16, respectively. The axle of the front wheel is swiveled for steering, which is done by a pair of foot pedals 17 connected to a transverse lever 18 secured intermediate its ends to the axle pivot 19. A pair of equalizer springs 20 are also provided for normally holding the steering wheel straight ahead.

On the axle 21 of the hind wheels 16 is pinned or otherwise fastened a ratchet wheel 22 which is surrounded by a drum 23 loose on said axle. This drum carries a transverse bolt 24 on which is pivoted a pawl 25 positioned to engage the teeth of the ratchet wheel 22. A spring 26 pressing on the pawl 25 tends to swing it in a direction away from or clear of the ratchet wheel teeth, the pawl being therefore normally out of engagement with the latter.

The pawl 25 has a lateral extension or finger 27 which projects radially through an aperture 28 in the periphery of the drum 23 and protrudes therefrom for a short distance.

To the periphery of the drum 23 is made fast as shown at 29, a strap 30 which latter, after passing partly around the drum and across the protruding end of the pawl finger 27, extends forwardly therefrom and has its forward end fastened to the lower end of a lever 31. This lever is fulcrumed in any suitable manner, as shown at 32, to the bottom of the vehicle body 10, and it passes through a slot 33 therein. The upper end of the lever is equipped with a cross-handle 34 having its ends loosely linked, as shown at 35, to the inner ends of the looms 11 of the oars.

To one side of the drum 23 is secured a smaller drum 36 to which is secured a coiled spring 37 which, after passing partly around said drum extends forwardly and is secured to the body 10.

The vehicle is propelled by the occupant thereof swinging the lever 31 back and forth. On the forward stroke of the lower end of the lever 31, the strap 30 is drawn forwardly, whereupon it imparts a partial rotation to the drum 23, which movement is transmitted to the axle 21 through the pawl 25 and the ratchet wheel 22. As pointed out hereinbefore, the pawl 25 is normally clear of the ratchet wheel 22, but when the strap 30 is pulled forwardly as just described it presses the pawl inwardly into operative engagement with the ratchet wheel. On the rearward stroke of the lower end of the lever 31, the strap 30 becomes slack, and the spring 26 presses the pawl outwardly clear of the ratchet wheel 22 and at the same time, the spring 37, which was placed under tension during the working stroke, rotates the drum 23, in a reverse direction to rewind the strap 30 thereon.

It will be evident from the foregoing that if the lever 31 is held stationary after the last described stroke, the vehicle can coast, as the pawl 25 is now clear of the ratchet wheel 22 and there is hence no driving connection with the axle 21. The vehicle can also now be pushed ahead or backed without using the lever 31.

The movement of the lever 31 is transmitted to the oars through the connections 35, and hence the oars swing back and forth when the lever is operated to propel the vehicle.

The vehicle is also provided with a brake consisting of a lever 38 pivoted to one side of the body 10, and equipped with a shoe 39 to engage one of the wheels 16.

I claim:

A juvenile vehicle propulsion means comprising an axle having a ratchet wheel, a drum receiving the ratchet wheel, and having an L-shaped pawl to engage the ratchet wheel, said pawl being provided with an outwardly projecting branch extending through the rim of the drum, a spring normally spacing the pawl from engagement with said ratchet wheel, a flat flexible strap secured to and trained about said drum and adapted to engage said outwardly projecting branch to press said pawl into engagement with said ratchet wheel, manually operated means for operating said flexible strap, a second drum secured to one side of said first named drum, and a spring trained about said second named drum and adapted to turn said first and second named drums to wind the strap thereon.

In testimony whereof I affix my signature.

FRED R. MOORE.